(12) United States Patent
Ma et al.

(10) Patent No.: US 12,425,980 B2
(45) Date of Patent: Sep. 23, 2025

(54) POWER CONTROL FOR SOUNDING REFERENCE SIGNAL IN NON-TERRESTRIAL NETWORKS

(71) Applicant: QUALCOMM Incorporated, San Diego, CA (US)

(72) Inventors: Liangping Ma, San Diego, CA (US); Gokul Sridharan, Sunnyvale, CA (US); Xiao Feng Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 406 days.

(21) Appl. No.: 18/073,405

(22) Filed: Dec. 1, 2022

(65) Prior Publication Data

US 2023/0362833 A1 Nov. 9, 2023

Related U.S. Application Data

(60) Provisional application No. 63/339,501, filed on May 8, 2022.

(51) Int. Cl.
*H04W 52/32* (2009.01)
*H04L 5/00* (2006.01)
*H04W 72/23* (2023.01)

(52) U.S. Cl.
CPC ......... *H04W 52/325* (2013.01); *H04L 5/0048* (2013.01); *H04W 72/23* (2023.01)

(58) Field of Classification Search
CPC . H04W 52/325; H04W 72/23; H04W 52/146; H04L 5/0048; H04L 5/0053
See application file for complete search history.

(56) References Cited

U.S. PATENT DOCUMENTS

2017/0150367 A1\* 5/2017 Han ................... H04L 27/0006
2020/0077428 A1\* 3/2020 Zhou .................... H04W 72/23
(Continued)

OTHER PUBLICATIONS

Ericsson: "On Timing Relationship Maintenance Issues for NR NTN", •3GPP TSG-RAN WG1 Meeting #108-e, R1-2201804, 3rd Generation Partnership Project (3GPP), Mobile Competence Centre, 650, Route Des Lucioles, F-06921, Sophia-Antipolis Cedex, France, vol. RAN WG1, No. e-Meeting, Feb. 21, 2022-Mar. 3, 2022, 6 Pages, Feb. 14, 2022, XP052109750.
(Continued)

*Primary Examiner* — Dominic E Rego
(74) *Attorney, Agent, or Firm* — Patterson & Sheridan LLP

(57) ABSTRACT

Certain aspects of the present disclosure provide techniques for wireless communications by a user equipment (UE) generally including receiving signaling indicating one or more values for a scheduling offset between a downlink slot where downlink control information (DCI) is received and an uplink slot for transmitting a physical uplink shared channel (PUSCH) scheduled by the DCI; determining an additional offset to be used in conjunction with the scheduling offset values to determine PUSCH transmission timing; determining a power control adjustment for a sounding reference signal (SRS) transmission based on transmission power control (TPC) commands received in a time interval determined by one of the scheduling offset values and the additional offset; and transmitting SRS in an SRS transmission occasion, in accordance with the determined power control adjustment.

30 Claims, 10 Drawing Sheets

(56) References Cited

U.S. PATENT DOCUMENTS

| | | | |
|---|---|---|---|
| 2020/0145998 A1* | 5/2020 | Sun | H04B 7/0695 |
| 2020/0236692 A1* | 7/2020 | Lin | H04W 72/535 |
| 2020/0280969 A1* | 9/2020 | Liu | H04L 5/0091 |
| 2020/0322097 A1* | 10/2020 | Hsieh | H04L 1/1854 |
| 2020/0404648 A1* | 12/2020 | Kim | H04L 5/0044 |
| 2021/0050985 A1* | 2/2021 | Ang | H04W 72/23 |
| 2021/0075488 A1* | 3/2021 | Wu | H04W 24/10 |
| 2021/0092760 A1* | 3/2021 | Nam | H04W 72/23 |
| 2021/0099985 A1* | 4/2021 | Ang | H04W 72/23 |
| 2021/0105761 A1 | 4/2021 | Cheng et al. | |
| 2022/0053489 A1* | 2/2022 | Li | H04W 72/0446 |
| 2022/0124795 A1* | 4/2022 | Wu | H04W 56/0045 |
| 2022/0159700 A1* | 5/2022 | Maleki | H04W 72/23 |
| 2022/0209904 A1* | 6/2022 | Jang | H04L 1/1887 |
| 2022/0217621 A1* | 7/2022 | Papasakellariou | H04W 72/23 |
| 2022/0217629 A1* | 7/2022 | Gao | H04W 72/23 |
| 2022/0217748 A1* | 7/2022 | Seo | H04L 5/001 |
| 2022/0377805 A1* | 11/2022 | Seo | H04L 5/0094 |
| 2023/0099762 A1* | 3/2023 | Khoshkholgh Dashtaki | H04W 72/23 370/350 |
| 2023/0156645 A1* | 5/2023 | Yao | H04W 72/232 455/12.1 |
| 2023/0156646 A1* | 5/2023 | Yao | H04W 56/0045 370/329 |
| 2023/0156804 A1* | 5/2023 | Ye | H04L 5/0091 370/329 |
| 2024/0089964 A1* | 3/2024 | Yeo | H04L 27/26025 |
| 2024/0349216 A1* | 10/2024 | Wang | H04B 7/18513 |

OTHER PUBLICATIONS

International Search Report and Written Opinion—PCT/US2023/064021—ISA/EPO—Jun. 16, 2023.

LG Electronics: "Discussion on UL Power Control for NR Non-CA Case", 3GPP TSG RAN WG1 Meeting 91, R1-1719944 NR UL PC_NONCA_FINAL, 3rd Generation Partnership Project (3GPP), Mobile Competence Centre, 650, Route Des Lucioles, F-06921 Sophia-Antipolis Cedex, France, vol. RAN WG1, No. Reno, USA, Nov. 27, 2017-Dec. 1, 2017, 11 Pages, Nov. 18, 2017, XP051369657, Section 4, p. 10, Section 5.

* cited by examiner

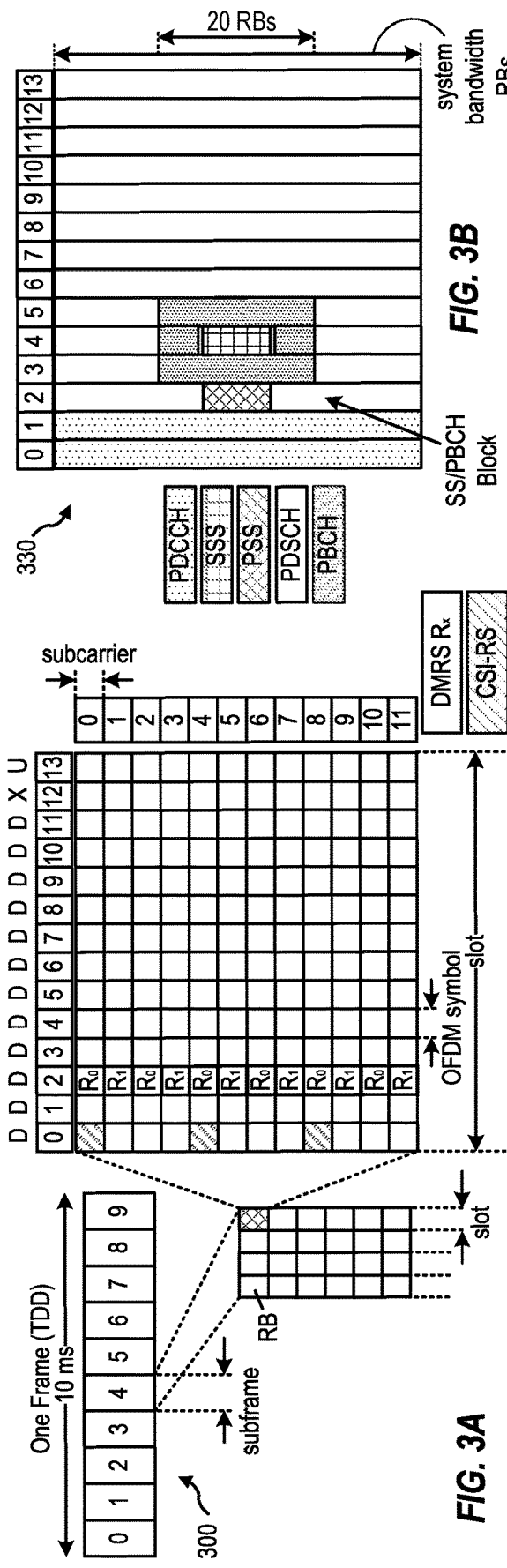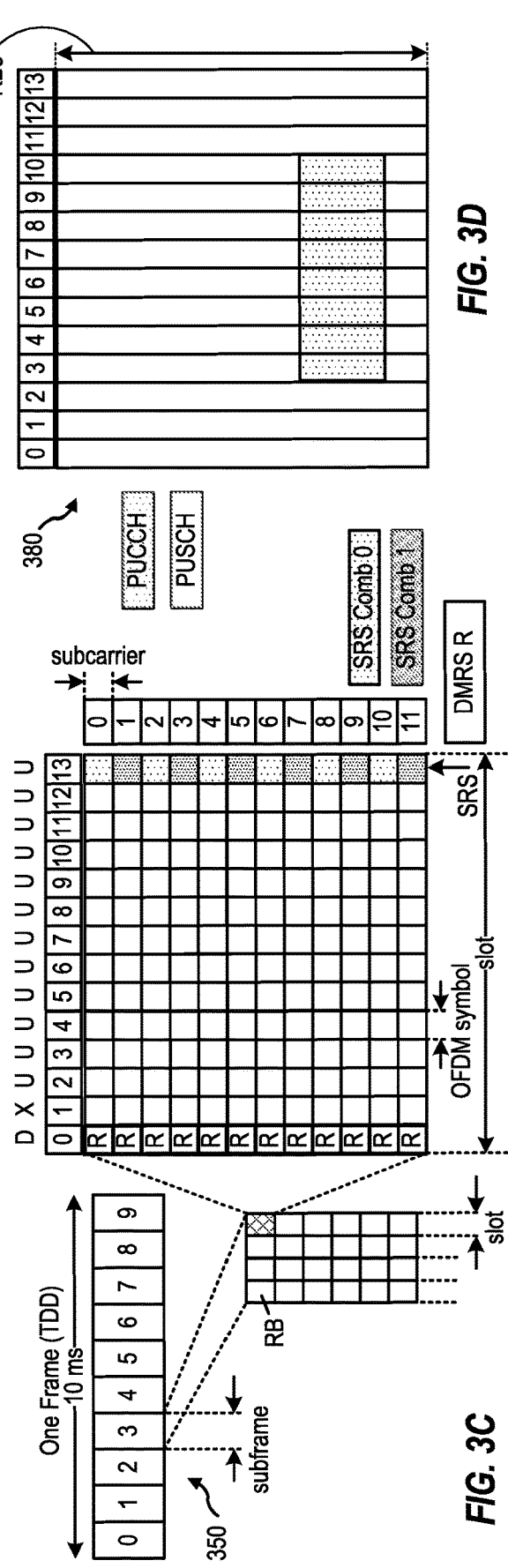

POWER CONTROL FOR SOUNDING REFERENCE SIGNAL IN NON-TERRESTRIAL NETWORKS

CROSS-REFERENCE TO RELATED APPLICATIONS

This application claims benefit of U.S. Provisional Application No. 63/339,501, filed May 8, 2022, which is assigned to the assignee hereof and hereby expressly incorporated by reference in its entirety as if fully set forth below and for all applicable purposes.

INTRODUCTION

Aspects of the present disclosure relate to wireless communications, and more particularly, to techniques for sounding reference signal (SRS) power control in non-terrestrial networks (NTNs).

Wireless communication systems are widely deployed to provide various telecommunication services such as telephony, video, data, messaging, broadcasts, or other similar types of services. These wireless communication systems may employ multiple-access technologies capable of supporting communication with multiple users by sharing available system resources with those users (e.g., bandwidth, transmit power, or other resources). Multiple-access technologies can rely on any of code division, time division, frequency division orthogonal frequency division, single-carrier frequency division, or time division synchronous code division, to name a few. These and other multiple access technologies have been adopted in various telecommunication standards to provide a common protocol that enables different wireless devices to communicate on a municipal, national, regional, and even global level.

Although wireless communication systems have made great technological advancements over many years, challenges still exist. For example, complex and dynamic environments can still attenuate or block signals between wireless transmitters and wireless receivers, undermining various established wireless channel measuring and reporting mechanisms, which are used to manage and optimize the use of finite wireless channel resources. Consequently, there exists a need for further improvements in wireless communications systems to overcome various challenges.

SUMMARY

In one aspect, a method for wireless communications by a user equipment (UE) comprises receiving signaling indicating one or more values for a scheduling offset between a downlink slot where downlink control information (DCI) is received and an uplink slot for transmitting a physical uplink shared channel (PUSCH) scheduled by the DCI; determining an additional offset to be used in conjunction with the scheduling offset values to determine PUSCH transmission timing; determining a power control adjustment for a sounding reference signal (SRS) transmission based on transmission power control (TPC) commands received in a time interval determined by one of the scheduling offset values and the additional offset; and transmitting SRS in an SRS transmission occasion, in accordance with the determined power control adjustment.

Other aspects provide: an apparatus operable, configured, or otherwise adapted to perform the aforementioned methods as well as those described elsewhere herein; a non-transitory, computer-readable media comprising instructions that, when executed by one or more processors of an apparatus, cause the apparatus to perform the aforementioned methods as well as those described elsewhere herein; a computer program product embodied on a computer-readable storage medium comprising code for performing the aforementioned methods as well as those described elsewhere herein; and an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF THE DRAWINGS

The appended figures depict certain features of the various aspects described herein and are not to be considered limiting of the scope of this disclosure.

FIGS. 3A, 3B, 3C, and 3D depict various example aspects of data structures for a wireless communication network.

The APPENDIX includes details of aspects of the present disclosure.

DETAILED DESCRIPTION

Aspects of the present disclosure relate to wireless communications, and more particularly, to techniques for sounding reference signal (SRS) power control in non-terrestrial networks (NTNs).

In wireless networks, a scheduling offset (referred to as k2) represents a time (in number of slots) after scheduling a physical uplink shared channel (PUSCH) transmission from a UE, that a base station (e.g., a gNB) expects to receive the PUSCH from the UE. In conventional terrestrial networks (TNs), this scheduling offset may be a few slots. For NTNs, an additional scheduling offset parameter ($K_{offset}$) may be used to accommodate a larger propagation delay (and ensure causality, meaning the gNB has some assurance the PUSCH is from the UE it was scheduled from). The combined offsets (e.g., k2 and $K_{offset}$) are expected to cover the round trip time (RTT) between a serving satellite and a reference point and a RTT of a service link.

In typical systems, sounding reference signal (SRS) transmission power control adjustments may account for the conventional scheduling offset, k2, but do not account for the additional scheduling offset for NTNs. As a result, existing techniques may be sub-optimal for adjusting SRS transmission power in NTNs.

Aspects of the present disclosure, however, provide techniques for SRS transmission power control adjustments that account for both the conventional scheduling offset, k2, as well as the additional scheduling offset for NTNs. As a result, the techniques presented herein may result in improved transmission power control for SRS transmissions in NTNs.

Introduction to Wireless Communication Networks

Figure 1:
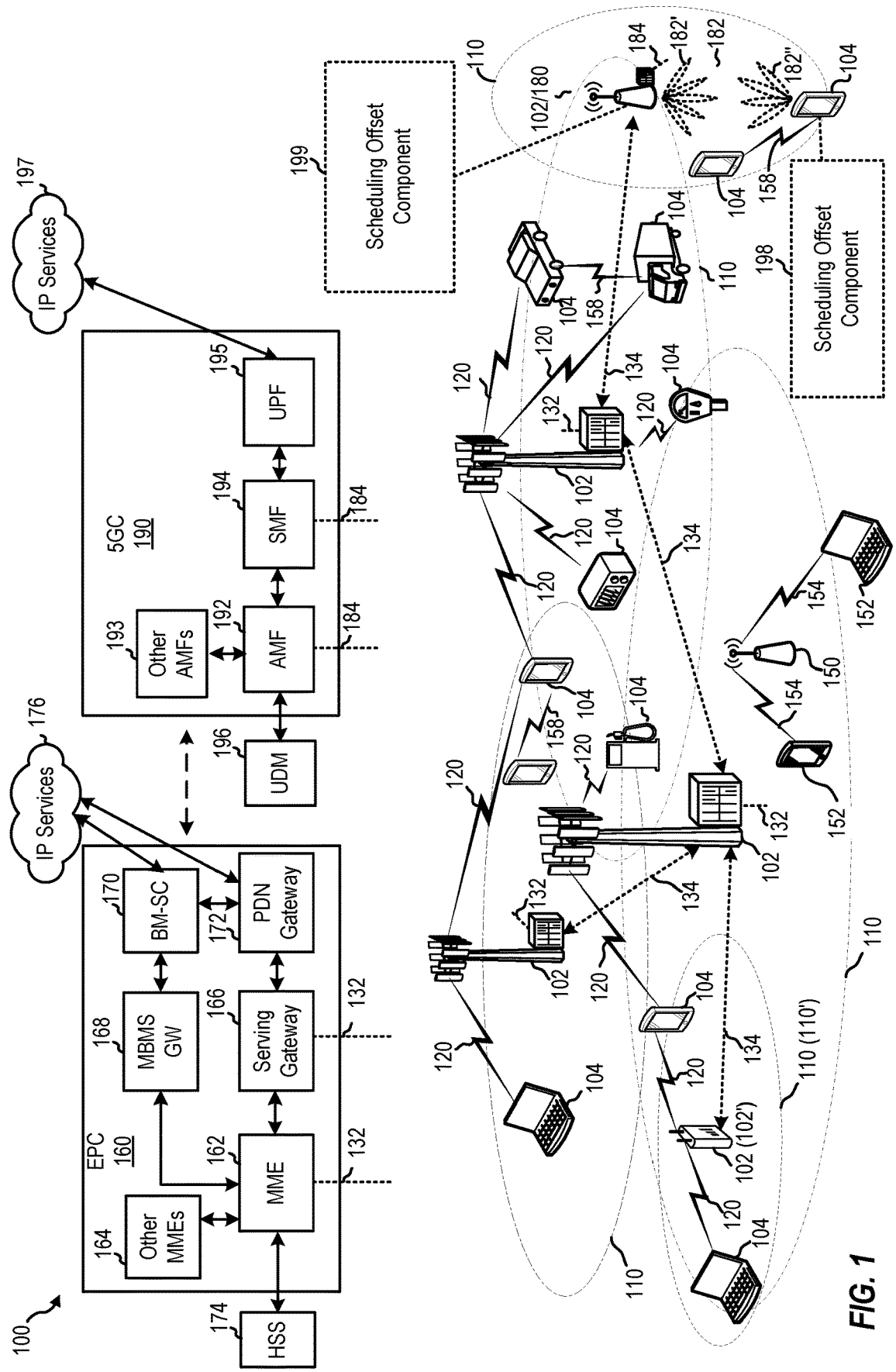
FIG. 1 is a block diagram conceptually illustrating an example wireless communication network.

FIG. 1 depicts an example of a wireless communications system 100, in which aspects described herein may be implemented.

Generally, wireless communications system 100 includes base stations (BSs) 102, user equipments (UEs) 104, one or more core networks, such as an Evolved Packet Core (EPC) 160 and 5G Core (5GC) network 190, which interoperate to provide wireless communications services.

Base stations 102 may provide an access point to the EPC 160 and/or 5GC 190 for a user equipment 104, and may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, delivery of warning messages, among other functions. Base stations may include and/or be referred to as a gNB, NodeB, eNB, ng-eNB (e.g., an eNB that has been enhanced to provide connection to both EPC 160 and 5GC 190), an access point, a base transceiver station, a radio base station, a radio transceiver, or a transceiver function, or a transmission reception point in various contexts.

Base stations 102 wirelessly communicate with UEs 104 via communications links 120. Each of base stations 102 may provide communication coverage for a respective geographic coverage area 110, which may overlap in some cases. For example, small cell 102' (e.g., a low-power base station) may have a coverage area 110' that overlaps the coverage area 110 of one or more macrocells (e.g., high-power base stations).

The communication links 120 between base stations 102 and UEs 104 may include uplink (UL) (also referred to as reverse link) transmissions from a user equipment 104 to a base station 102 and/or downlink (DL) (also referred to as forward link) transmissions from a base station 102 to a user equipment 104. The communication links 120 may use multiple-input and multiple-output (MIMO) antenna technology, including spatial multiplexing, beamforming, and/or transmit diversity in various aspects.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player, a camera, a game console, a tablet, a smart device, a wearable device, a vehicle, an electric meter, a gas pump, a large or small kitchen appliance, a healthcare device, an implant, a sensor/actuator, a display, or other similar devices. Some of UEs 104 may be internet of things (IoT) devices (e.g., parking meter, gas pump, toaster, vehicles, heart monitor, or other IoT devices), always on (AON) devices, or edge processing devices. UEs 104 may also be referred to more generally as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, or a client.

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, base station 180 and the UE 104 may each include a plurality of antennas, such as antenna elements, antenna panels, and/or antenna arrays to facilitate the beamforming.

In some cases, base station 180 may transmit a beamformed signal to UE 104 in one or more transmit directions 182'. UE 104 may receive the beamformed signal from the base station 180 in one or more receive directions 182". UE 104 may also transmit a beamformed signal to the base station 180 in one or more transmit directions 182". Base station 180 may also receive the beamformed signal from UE 104 in one or more receive directions 182'. Base station 180 and UE 104 may then perform beam training to determine the best receive and transmit directions for each of base station 180 and UE 104. Notably, the transmit and receive directions for base station 180 may or may not be the same. Similarly, the transmit and receive directions for UE 104 may or may not be the same.

Wireless communication network 100 includes scheduling offset component 199, which may be configured to perform various operations described herein for collecting and reporting data for NTN. Wireless network 100 further includes scheduling offset component 198, which may be used configured to perform various operations described herein for processing data collected and reported for NTN.

Figure 2:
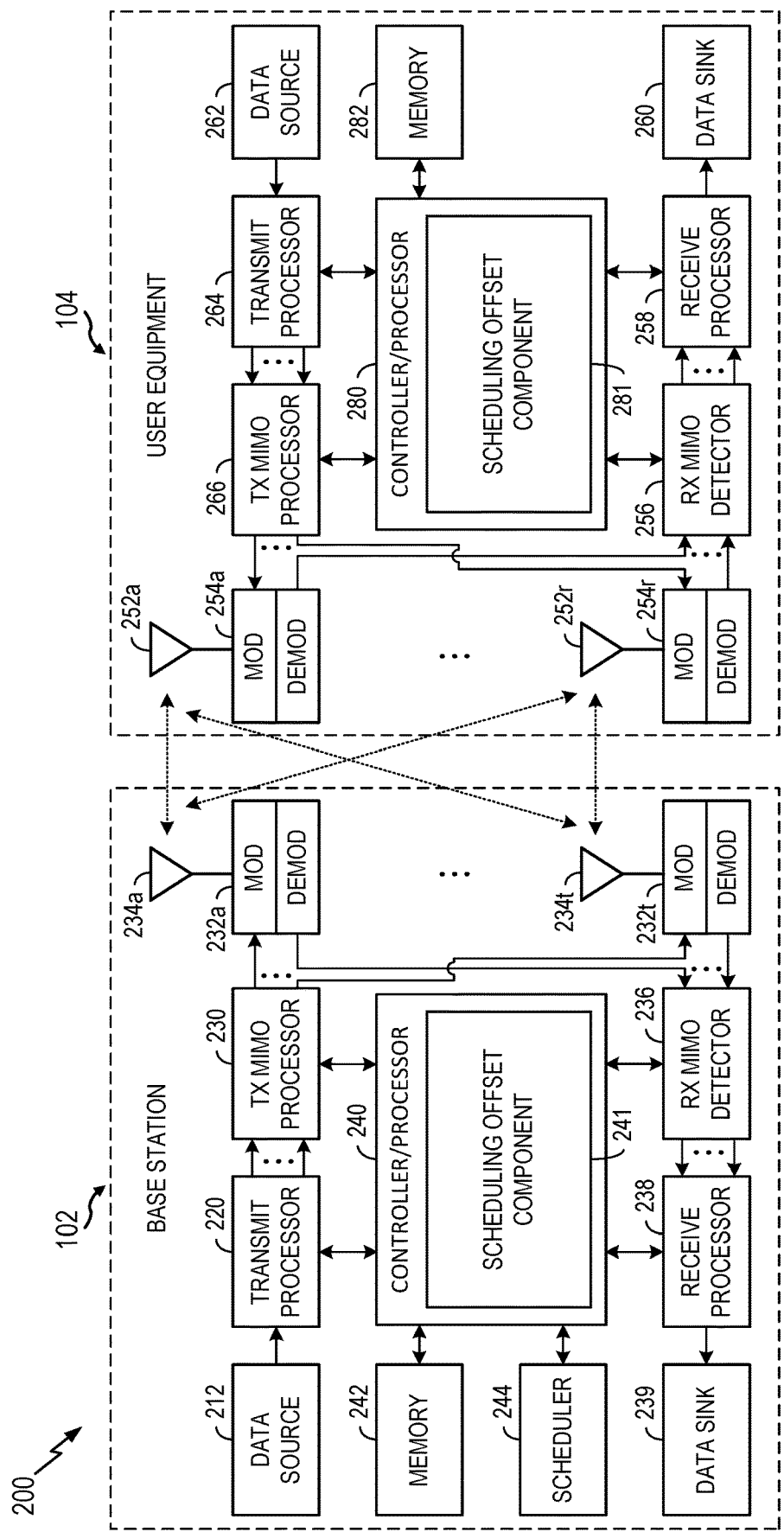
FIG. 2 is a block diagram conceptually illustrating aspects of an example a base station and user equipment.

FIG. 2 depicts aspects of an example base station (BS) 102 and a user equipment (UE) 104.

Generally, base station 102 includes various processors (e.g., 220, 230, 238, and 240), antennas 234a-t (collectively 234), transceivers 232a-t (collectively 232), which include modulators and demodulators, and other aspects, which enable wireless transmission of data (e.g., data source 212) and wireless reception of data (e.g., data sink 239). For example, base station 102 may send and receive data between itself and user equipment 104.

Base station 102 includes controller/processor 240, which may be configured to implement various functions related to wireless communications. In the depicted example, controller/processor 240 includes scheduling offset component 241, which may be representative of scheduling offset component 199 of FIG. 1. Notably, while depicted as an aspect of controller/processor 240, scheduling offset component 241 may be implemented additionally or alternatively in various other aspects of base station 102 in other implementations.

Generally, user equipment 104 includes various processors (e.g., 258, 264, 266, and 280), antennas 252a-r (collectively 252), transceivers 254a-r (collectively 254), which include modulators and demodulators, and other aspects, which enable wireless transmission of data (e.g., data source 262) and wireless reception of data (e.g., data sink 260).

User equipment 104 includes controller/processor 280, which may be configured to implement various functions related to wireless communications. In the depicted example, controller/processor 280 includes scheduling offset component 281, which may be representative of scheduling offset component 198 of FIG. 1. Notably, while depicted as an aspect of controller/processor 280, scheduling offset component 281 may be implemented additionally or alternatively in various other aspects of user equipment 104 in other implementations.

FIGS. 3A-3D depict aspects of data structures for a wireless communication network, such as wireless communication network 100 of FIG. 1. In particular, FIG. 3A is a diagram 300 illustrating an example of a first subframe within a 5G (e.g., 5G NR) frame structure, FIG. 3B is a diagram 330 illustrating an example of DL channels within a 5G subframe, FIG. 3C is a diagram 350 illustrating an example of a second subframe within a 5G frame structure, and FIG. 3D is a diagram 380 illustrating an example of UL channels within a 5G subframe.

Further discussions regarding FIG. 1, FIG. 2, and FIGS. 3A-3D are provided later in this disclosure.

Introduction to mmWave Wireless Communications

In wireless communications, an electromagnetic spectrum is often subdivided, into various classes, bands, channels, or other features. The subdivision is often provided based on wavelength and frequency, where frequency may also be referred to as a carrier, a subcarrier, a frequency channel, a tone, or a subband.

In 5G, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is sometimes referred to (interchangeably) as a "millimeter wave" ("mmW" or "mmWave") band in documents and articles, despite being different from the extremely high frequency (EHF) band (30 GHz-300 GHz), which is identified by the International Telecommunications Union (ITU) as a "millimeter wave" band because wavelengths at these frequencies are between 1 millimeter and 10 millimeters. Radio waves in the band may be referred to as a millimeter wave. Near mmWave may extend down to a frequency of 3 GHz with a wavelength of 100 millimeters. The super high frequency (SHF) band extends between 3 GHz and 30 GHz, also referred to as centimeter wave.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

Communications using the mmWave/near mmWave radio frequency band (e.g., 3 GHz-300 GHz) may have higher path loss and a shorter range compared to lower frequency communications. Accordingly, in FIG. 1, mmWave base station 180 may utilize beamforming 182 with the UE 104 to improve path loss and range. To do so, base station 180 and the UE 104 may each include a plurality of antennas, such as antenna elements, antenna panels, and/or antenna arrays to facilitate the beamforming.

In some cases, base station 180 may transmit a beamformed signal to UE 104 in one or more transmit directions 182'. UE 104 may receive the beamformed signal from the base station 180 in one or more receive directions 182". UE 104 may also transmit a beamformed signal to the base station 180 in one or more transmit directions 182". Base station 180 may receive the beamformed signal from UE 104 in one or more receive directions 182'. Base station 180 and UE 104 may then perform beam training to determine the best receive and transmit directions for each of base station 180 and UE 104. Notably, the transmit and receive directions for base station 180 may or may not be the same. Similarly, the transmit and receive directions for UE 104 may or may not be the same.

Aspects Related to Non-Terrestrial Network

A non-terrestrial network (NTN) generally refers to a network, or segment of networks using RF resources on board a satellite. NTN signaling could be regenerative (with on-board NTN processing) or transparent (e.g., so called bent pipe where the satellite sends back to Earth what it receives with only amplification and a shift from uplink to downlink frequency).

Figure 4:
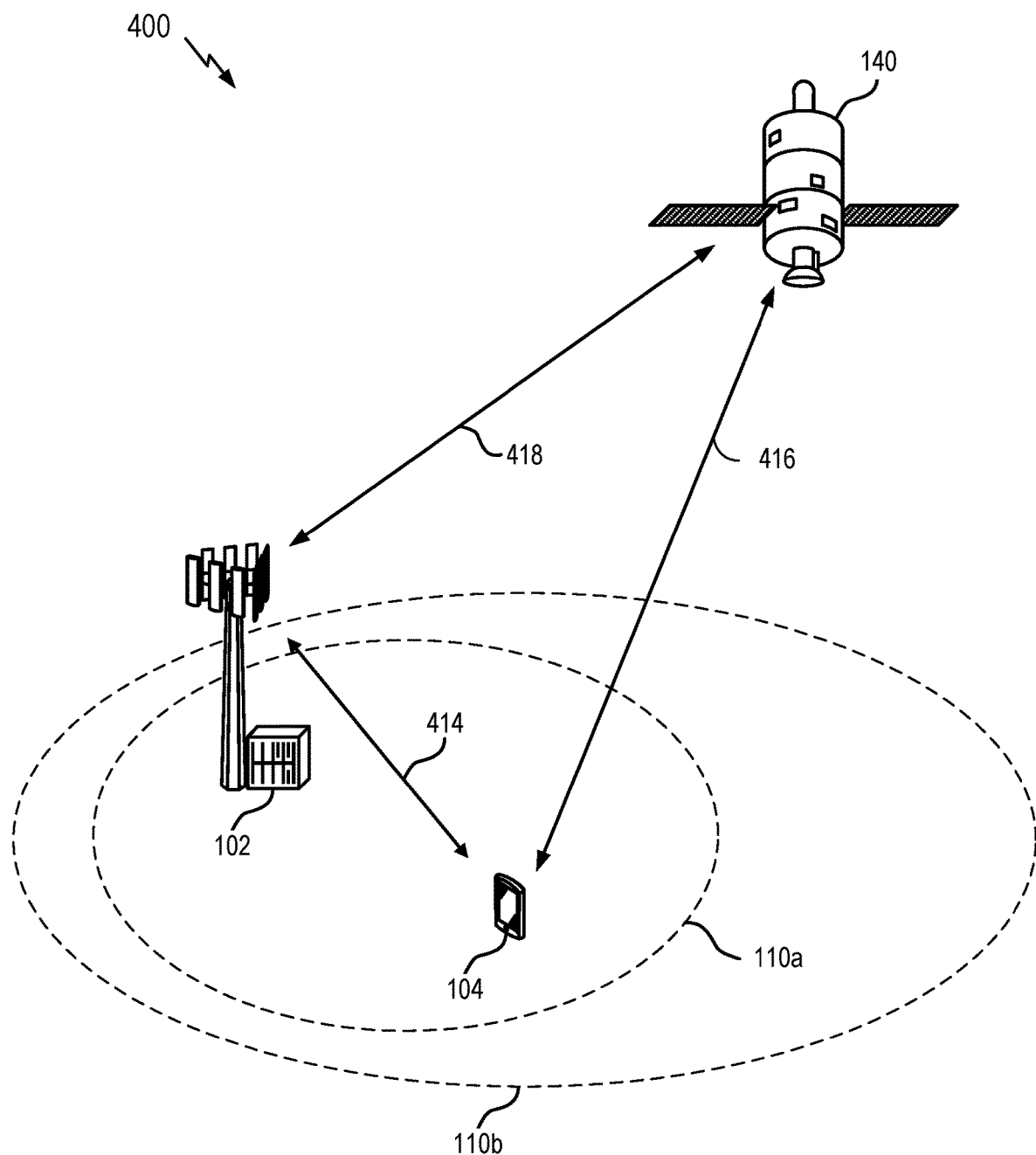
FIG. 4 depicts an example non-terrestrial network (NTN).

FIG. 4 illustrates an example of a wireless communications network 400 including a non-terrestrial network (NTN) entity 140 (which may be generally referred to as NTN 140), in which aspects of the present disclosure may be practiced. In some examples, the wireless communications network 400 may implement aspects of the wireless communication network 100. For example, the wireless communications network 400 may include BS 102, UE 104, and the non-terrestrial network entity 140, such as a satellite. BS 102 may serve a coverage area or cell 110a in cases of a terrestrial network, and non-terrestrial network entity 140 may serve the coverage area 110b in cases of a non-terrestrial network (NTN). Some NTNs may employ airborne platforms (e.g., a drone or balloon) and/or spaceborne platforms (e.g., a satellite).

The non-terrestrial network entity 140 may communicate with the BS 102 and UE 104 as part of wireless communications in an NTN. In cases of a terrestrial network, the UE 104 may communicate with the BS 102 over a communication link 414. In the case of NTN wireless communications, the non-terrestrial network entity 140 may be a serving cell for the UE 104 via a communication link 416. In certain aspects, the non-terrestrial network entity 140 may act as a relay (or a remote radio head) for the BS 102 and the UE 104. For example, the BS 102 may communicate with the non-terrestrial network entity 140 via a communication link 418, and the non-terrestrial network entity may relay signaling between the BS 102 and UE 104 via the communication links 416, 418.

Figure 5A:
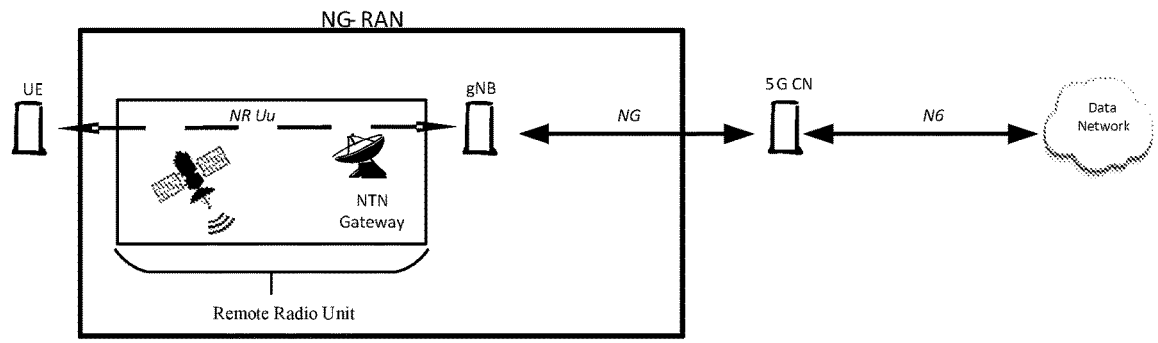
FIGS. 5A and 5B depict example architectures of an NTN.

Typical footprint size of an NTN beam is 100 to 1000 km for a LEO satellite and 200 to 3500 km for a Geostationary orbit (GEO) satellite. As illustrated in FIG. 5A, an NG-RAN deployment may include satellite and NTN gateway (GW) serving as the cellular Uu) link between a UE and a terrestrial network (TN) gNB (and the 5G core network). NG-RAN generally represents radio access network for 5G and provides both NR and LTE radio access. The link between the UE and satellite is generally referred to as the service link, while the link between the satellite and GW is generally referred to as the feeder link.

Figure 5B:
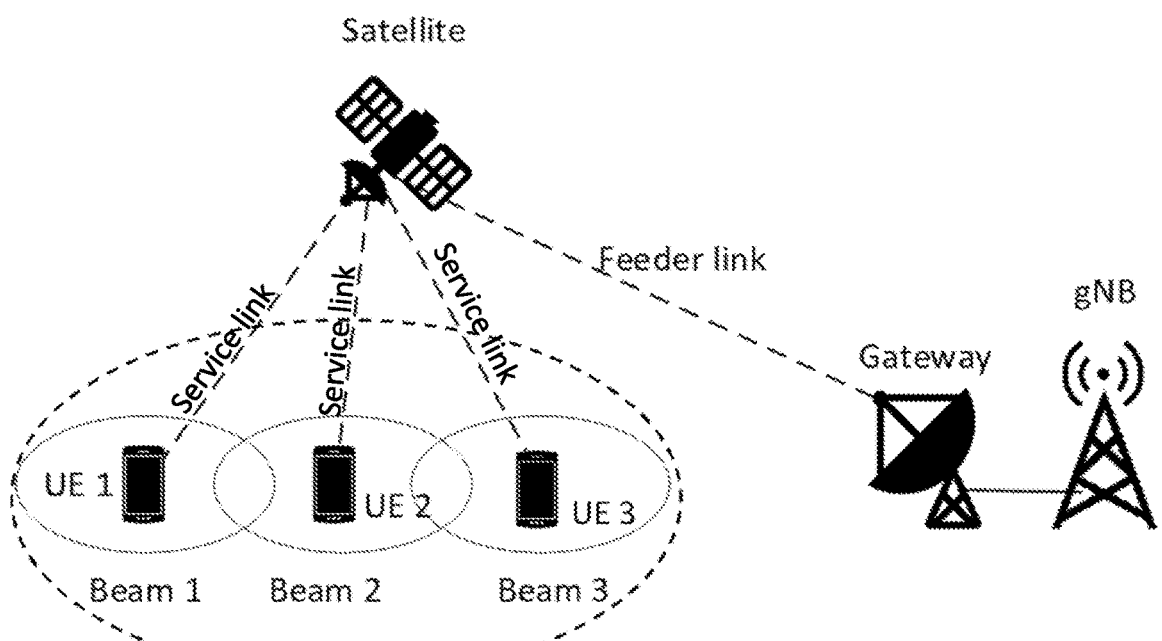

As illustrated in FIG. 5B, the satellite communicates with different UEs as it moves across its orbit. In the illustrated example, as the satellite orbits, it communicates with three UEs (UE1, UE2, and UE3) through three different beams (beam1, beam2, and beam3). Uplink signals from the UEs experience a round trip delay (RTD) that is generally a sum of the delay on the service link plus the delay on the feeder link. The maximum RTD is typically around 541.46 ms for GEO satellites, 25.77 ms for LEO satellites at 600 km altitude, and 41.77 ms for LEO satellites at 1200 km altitude. UE speed can typically be ignored in comparison with speed of LEO satellite.

Aspects Related to Power Control for SRS in Non-Terrestrial Networks

Aspects of the present disclosure relate to wireless communications, and more particularly, to techniques for sounding reference signal (SRS) power control in non-terrestrial networks (NTNs).

As noted above, for NTNs, the additional scheduling offset $K_{offset}$ may be used to accommodate a larger propagation delay. The combined offsets are expected to cover the RTT between a serving satellite and a reference point and a RTT of a service link.

Figure 6:
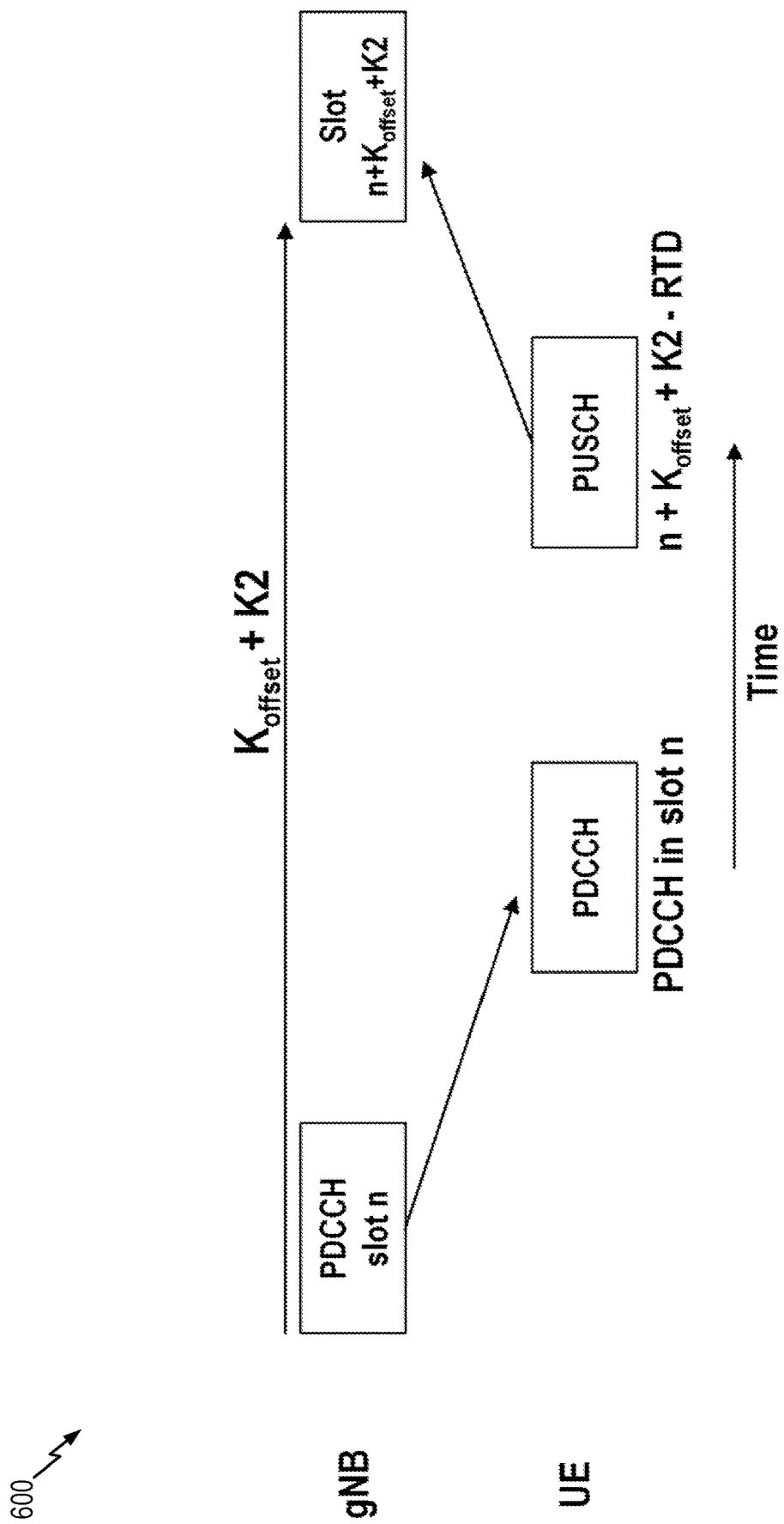
FIG. 6 depicts an example timeline from downlink control information (DCI) to physical uplink shared channel (PUSCH), according to aspects of the present disclosure.

FIG. 6 graphically illustrates how the scheduling offset K2 may be used in conjunction with the NTN scheduling offset $K_{offset}$. As illustrated, after sending a PDCCH in slot n (with a DCI) scheduling a PUSCH from a UE, the gNB expects the PUSCH in slot n+K2+$K_{offset}$, where $K_{offset}$ is greater than the round trip delay (RTD) between the UE and the gNB. The UE may then know when to transmit PUSCH, based on the RTD, so that it arrives at the gNB when expected.

The scheduling offset may be applied to various types of uplink transmissions, such as a physical random access channel (PRACH) transmission (e.g., Msg1 in 4-step RACH), MsgA (e.g., PRACH sequence and a PUSCH, as in 2-step RACH), PUSCH, or PUCCH transmission.

In some cases, the UE-specific additional scheduling offset $K_{offset}$ may be determined based on a (RRC-configured) cell-specific Koffset $K_{cell,offset}$ and a network signaled (UE-specific) difference value (referred to as $K_{UE,offset}$), as:

$K_{offset}=K_{cell,offset}-K_{UE,offset}$

The difference value may be signaled, for example, via a MAC CE. Signaling the UE specific difference value may save signaling overhead by using fewer bits when compared to signaling an absolute value for the UE-specific additional scheduling offset $K_{offset}$.

As noted above, in typical systems, SRS transmission power control adjustments account for the conventional scheduling offset, k2, but do not account for the additional scheduling offset for NTNs. Aspects of the present disclosure, however, provide techniques for SRS transmission power control adjustments that account for both the conventional scheduling offset, k2, as well as the additional scheduling offset for NTNs.

Figure 7:
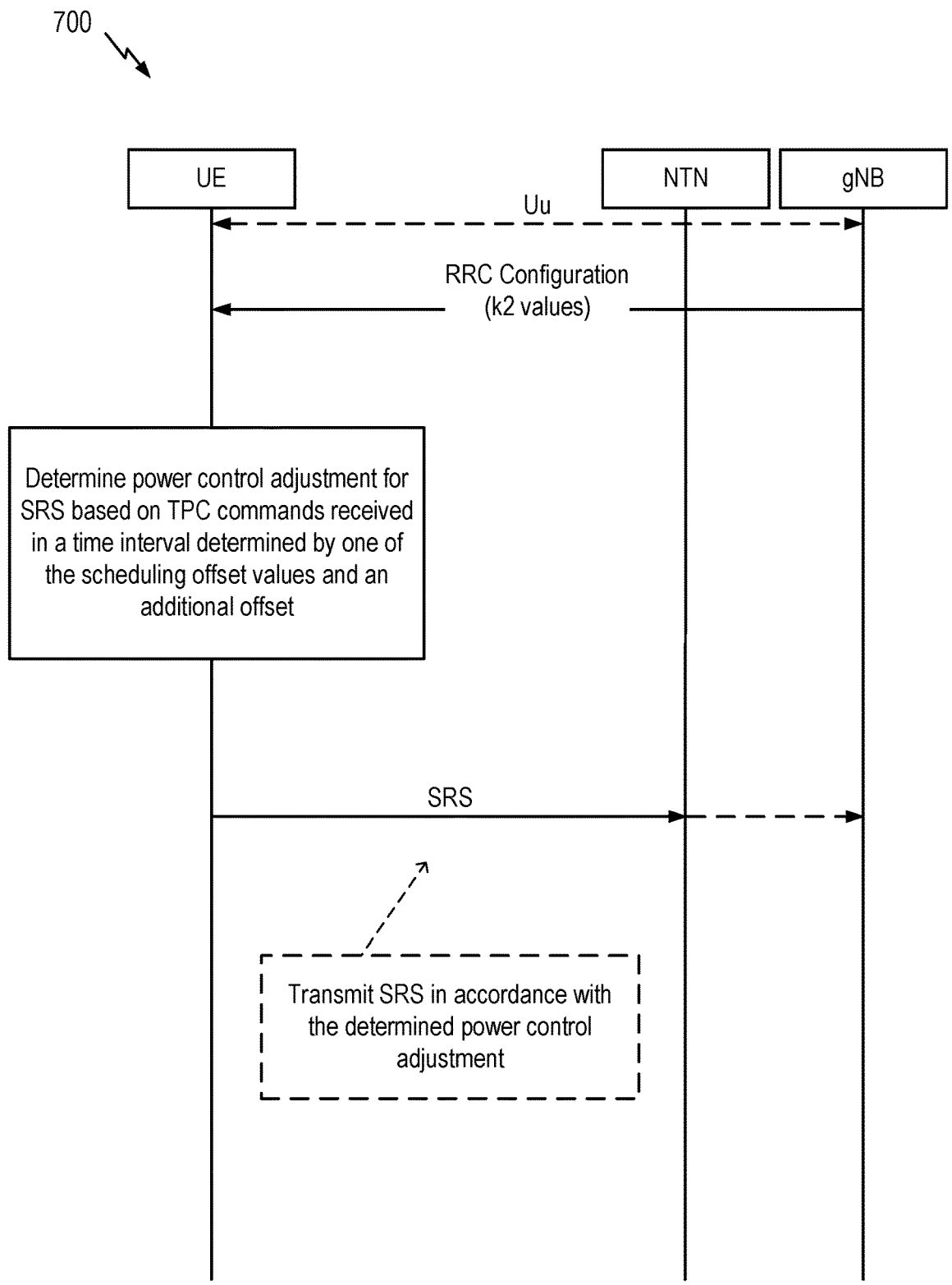
FIG. 7 depicts timing for SRS transmissions, according to aspects of the present disclosure.

The techniques presented herein for SRS transmit power control in NTNs may be understood with reference to the call flow diagram 700 of FIG. 7.

As illustrated, the network may indicate, to the UE, a set of scheduling offset (k2) values. For the SRS transmissions that are semi-persistent or periodic, the UE may determine a power control adjustment based on TPC commands received in a time interval determined by one of the scheduling offset values and an additional offset transmission power. The UE may then transmit the SRS in accordance with the determined power control adjustment.

Figure 8:
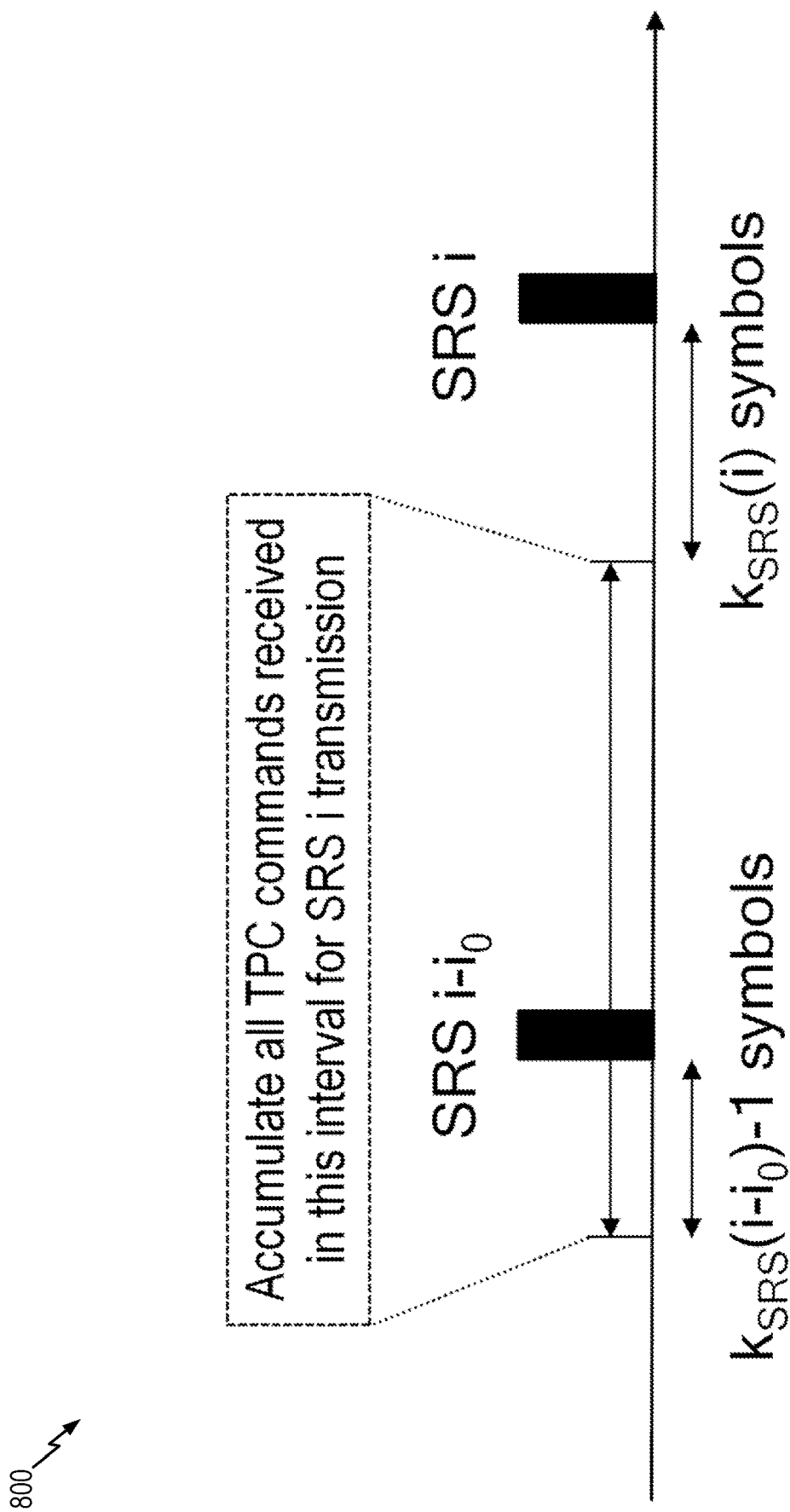
FIG. 8 depicts a call flow diagram for SRS transmission power control, in accordance with aspects of the present disclosure.

FIG. 8 illustrates an example of the time interval over which TPC commands may be accumulated. As illustrated, for an SRS transmission occasion i, the UE may accumulate all TPC commands received in a period starting a first number $k_{SRS}(i-i0)-1$ of symbols before a previous SRS transmission occasion i-i0 and ending a second number $k_{SRS}(i)$ of symbols before SRS transmission occasion i.

In some cases, if the SRS transmission is semi-persistent or periodic, $K_{SRS}(i)$ is a number of $K_{SRS,min}$ symbols equal to the product of a number of symbols per slot, $N_{symb}^{slot}$, and the sum of the minimum of the values provided by k2 in PUSCH-ConfigCommon for active UL BWP b of carrier f of serving cell c and $+2^\mu K_{offset}$, where Koffset is cell-specific or UE-specific if a UE-specific value is indicated, and μ is the subcarrier spacing index corresponding to a subcarrier spacing of $2^\mu \times 15$ kHz.

In some cases, if the SRS transmission is semi-persistent or periodic, $K_{SRS}(i)$ is a number of $K_{SRS,min}$ symbols equal to the product of a number of symbols per slot, $N_{symb}^{slot}$ and the sum of the minimum of the values provided by k2 in PUSCH-ConfigCommon for active UL BWP b of carrier f of serving cell c and $2^\mu K_{offset}$, where $K_{offset}=K_{cell,offset}-K_{UE,offset}$, where $K_{cell,offset}$ is provided by CellSpecificKoffset, and $K_{UE,offset}$ is provided by a MAC CE command; otherwise, if not provided respectively, $K_{cell,offset}=0$ or $K_{UE,offset}=0$. μ is the subcarrier spacing index corresponding to a subcarrier spacing of $2^\mu \times 15$ kHz.

Example Operations of a User Equipment

Figure 9:
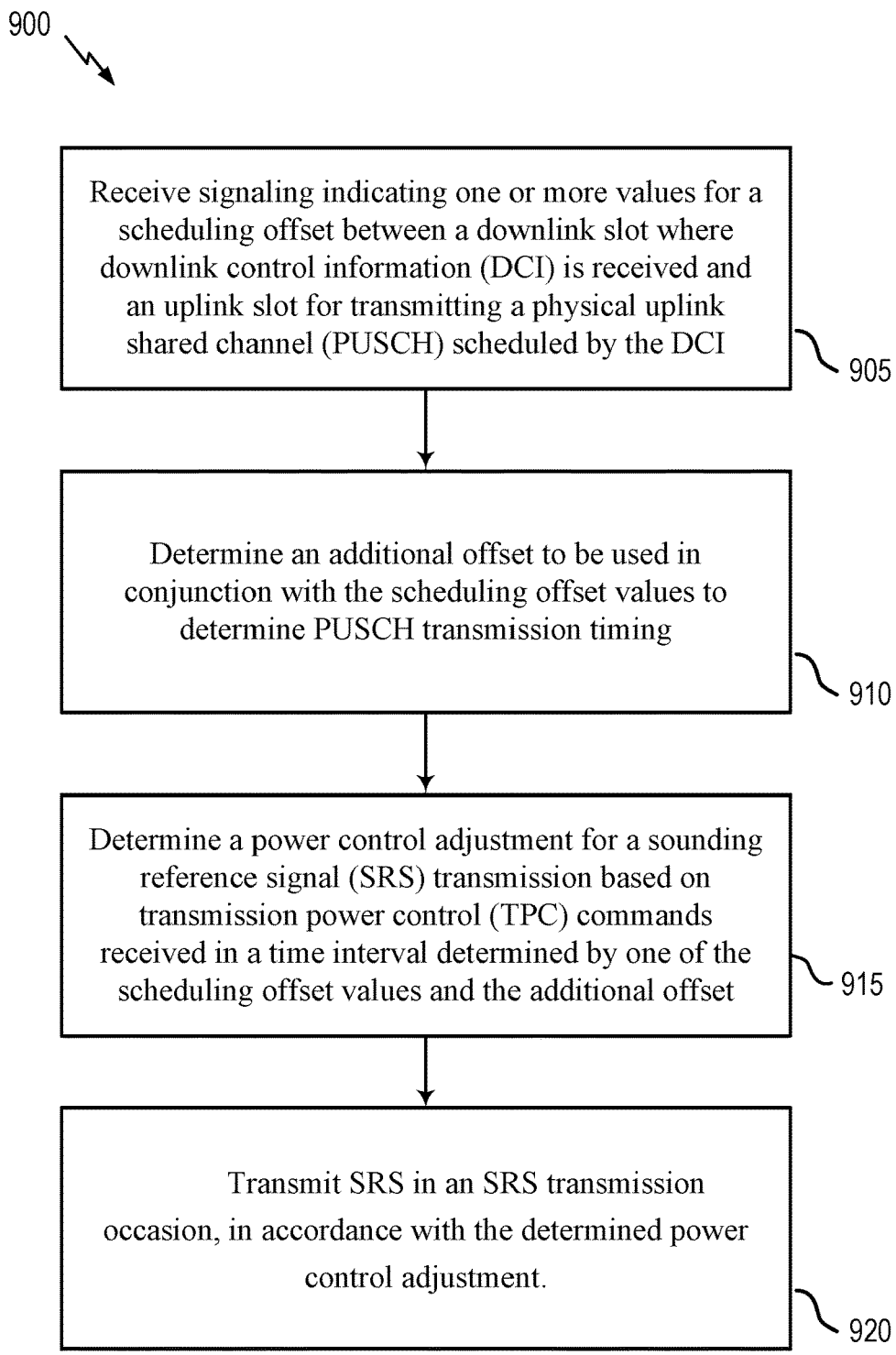
FIG. 9 illustrates example operations for wireless communications by a user equipment, in accordance with aspects of the present disclosure.

FIG. 9 shows a method 900 for wireless communications by a UE, such as UE 104 of FIGS. 1 and 2.

Method 900 begins at 905 with receiving signaling indicating one or more values for a scheduling offset between a downlink slot where downlink control information (DCI) is received and an uplink slot for transmitting a physical uplink shared channel (PUSCH) scheduled by the DCI. In some cases, the operations of this step refer to, or may be performed by, circuitry for transmitting and/or code for transmitting as described with reference to FIG. 10.

Method 900 then proceeds to step 910 with determining an additional offset to be used in conjunction with the scheduling offset values to determine PUSCH transmission timing. For example, as illustrated in FIG. 6, the scheduling offset K2 may be used in conjunction with the NTN scheduling offset $K_{offset}$, since the gNB may expect the PUSCH in slot n+K2+$K_{offset}$, where $K_{offset}$ is greater than the round trip delay (RTD) between the UE and the gNB. The UE may then know when to transmit PUSCH (e.g., PUSCH transmission timing), based on the RTD, so that it arrives at the gNB when expected. In some cases, the operations of this step refer to, or may be performed by, circuitry for transmitting and/or code for transmitting as described with reference to FIG. 10.

Method 900 then proceeds to step 915 with determining a power control adjustment for a sounding reference signal (SRS) transmission based on transmission power control (TPC) commands received in a time interval determined by one of the scheduling offset values and the additional offset. In some cases, the operations of this step refer to, or may be performed by, circuitry for transmitting and/or code for transmitting as described with reference to FIG. 10.

Method 900 then proceeds to step 920 with transmitting SRS in an SRS transmission occasion, in accordance with the determined power control adjustment. In some cases, the operations of this step refer to, or may be performed by, circuitry for transmitting and/or code for transmitting as described with reference to FIG. 10.

In some aspects, the SRS transmission is semi-persistent or periodic.

In some aspects, the additional offset is determined based on at least one of: a configured cell-specific additional offset value, or a UE-specific difference offset value.

In some aspects, the additional offset is determined by subtracting the UE-specific difference offset value from the cell-specific additional offset value.

In some aspects, the method 900 further includes comprising receiving a medium access control (MAC) control element (CE) that indicates the UE-specific difference offset value. In some cases, the operations of this step refer to, or may be performed by, circuitry for using and/or code for using as described with reference to FIG. 10.

In some aspects, the time interval is determined based on a parameter that represents a number of symbols and is determined based on a number of symbols per slot, a minimum of the scheduling offset values, and the additional offset value.

In some aspects, the parameter is determined as a product of the number of symbols per slot and a sum of a minimum of the scheduling offset values, which is $2^\mu K_{offset}$, wherein $K_{offset}$ is the additional offset value, and $\mu$ is the subcarrier spacing index corresponding to a subcarrier spacing $2^\mu \times 15$ kHz.

In some aspects, the parameter is determined as a product of the number of symbols per slot and a sum of a minimum of the scheduling offset values, which is $2^\mu K_{offset}$, where $K_{offset} = K_{cell,offset} - K_{UE,offset}$, wherein $K_{cell,offset}$ is the configured cell-specific additional offset value and $K_{UE,offset}$ is the UE-specific difference offset value, and $\mu$ is the subcarrier spacing index corresponding to a subcarrier spacing $2^\mu \times 15$ kHz.

In some aspects, $K_{cell,offset}$ is assumed to be 0 if the cell-specific additional offset value is not configured, and $K_{UE,offset}$ is assumed to be 0 if a UE-specific difference offset value is not signaled. $\mu$ is the subcarrier spacing index corresponding to a subcarrier spacing $2^\mu \times 15$ kHz.

Figure 10:
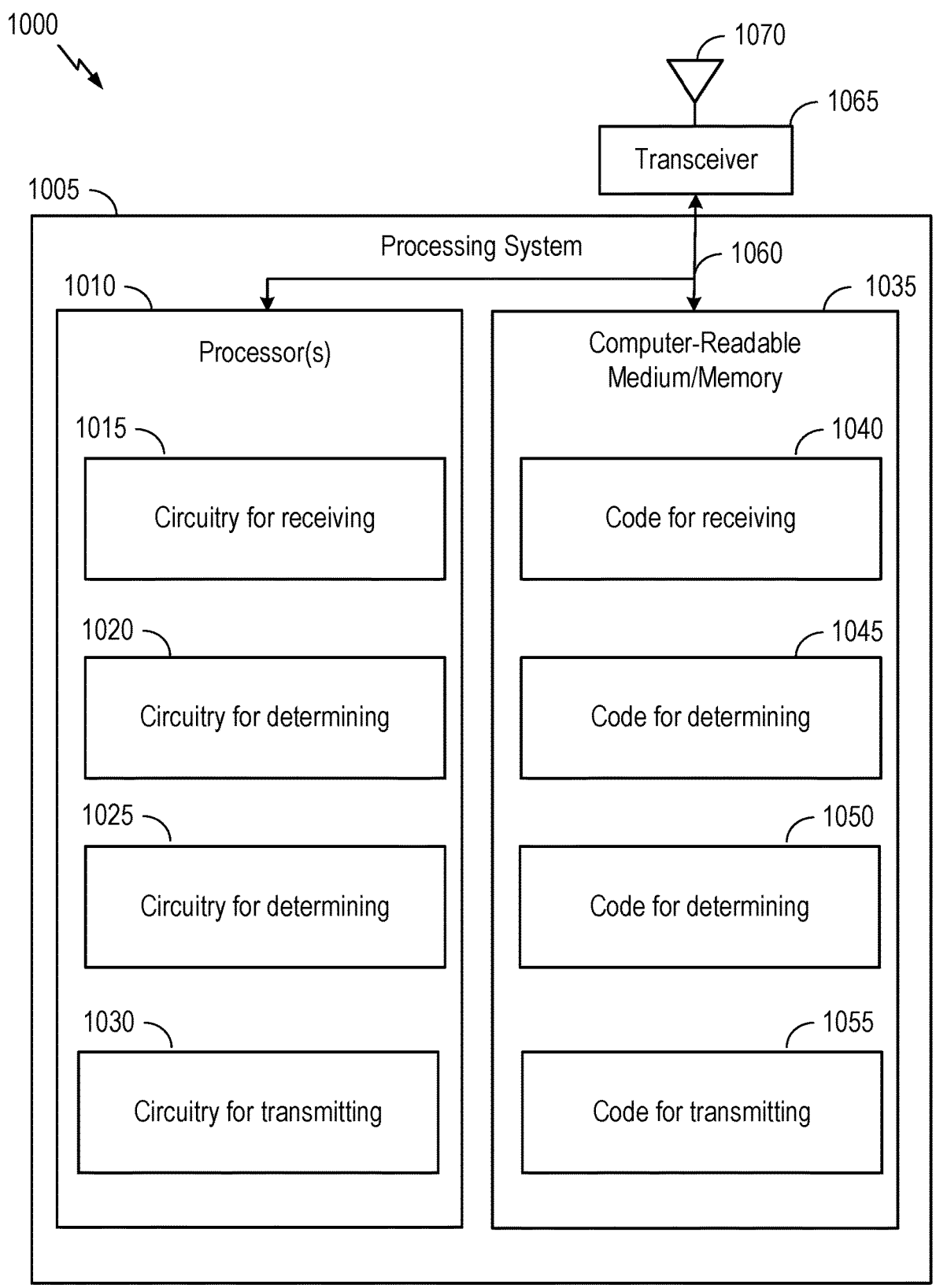
FIG. 10 shows an example of a communications device according to aspects of the present disclosure.

In one aspect, method 900, or any aspect related to it, may be performed by an apparatus, such as communications device 1000 of FIG. 10, which includes various components operable, configured, or adapted to perform the method 900. Communications device 1000 is described below in further detail.

Note that FIG. 9 is just one example of a method, and other methods including fewer, additional, or alternative steps are possible consistent with this disclosure.

Example Communications Devices

FIG. 10 depicts aspects of an example communications device 1000. In some aspects, communications device 1000 is a user equipment, such as UE 104 described above with respect to FIGS. 1 and 2.

The communications device 1000 includes a processing system 1005 coupled to the transceiver 1065 (e.g., a transmitter and/or a receiver). The transceiver 1065 is configured to transmit and receive signals for the communications device 1000 via the antenna 1070, such as the various signals as described herein. The processing system 1005 may be configured to perform processing functions for the communications device 1000, including processing signals received and/or to be transmitted by the communications device 1000.

The processing system 1005 includes one or more processors 1010. In various aspects, the one or more processors 1010 may be representative of one or more of receive processor 258, transmit processor 264, TX MIMO processor 266, and/or controller/processor 280, as described with respect to FIG. 2. The one or more processors 1010 are coupled to a computer-readable medium/memory 1035 via a bus 1060. In certain aspects, the computer-readable medium/memory 1035 is configured to store instructions (e.g., computer-executable code) that when executed by the one or more processors 1010, cause the one or more processors 1010 to perform the method 900 described with respect to FIG. 9, or any aspect related to it. Note that reference to a processor performing a function of communications device 1000 may include one or more processors 1010 performing that function of communications device 1000.

In the depicted example, computer-readable medium/memory 1035 stores code (e.g., executable instructions), such as code for receiving 1040, code for determining 1045, code for determining 1050, and code for transmitting 1055. Processing of the code for receiving 1040, code for determining 1045, code for determining 1050, and code for transmitting 1055 may cause the communications device 1100 to perform the method 900 described with respect to FIG. 9, or any aspect related to it.

The one or more processors 1110 include circuitry configured to implement (e.g., execute) the code stored in the computer-readable medium/memory 1135, including circuitry such as circuitry for transmitting 1115, circuitry for receiving 1120, circuitry for communicating 1125, and circuitry for using 1130. Processing with circuitry for transmitting 1115, circuitry for receiving 1120, circuitry for communicating 1125, and circuitry for using 1130 may cause the communications device 1100 to perform the method 900 described with respect to FIG. 9, or any aspect related to it.

Various components of the communications device 1000 may provide means for performing the method 900 described with respect to FIG. 9, or any aspect related to it. For example, means for transmitting, sending or outputting for transmission may include transceivers 254 and/or antenna(s) 252 of the UE 104 illustrated in FIG. 2 and/or the transceiver 1065 and the antenna 1070 of the communications device 1000 in FIG. 10. Means for receiving or obtaining may include transceivers 254 and/or antenna(s) 252 of the UE 104 illustrated in FIG. 2 and/or the transceiver 1065 and the antenna 1070 of the communications device 1000 in FIG. 10.

Example Clauses

Implementation examples are described in the following numbered clauses:

Clause 1: A method for wireless communications by a user equipment (UE), comprising: receiving signaling indicating one or more values for a scheduling offset between a downlink slot where downlink control information (DCI) is received and an uplink slot for transmitting a physical uplink shared channel (PUSCH) scheduled by the DCI; determining an additional offset to be used in conjunction with the scheduling offset values to determine PUSCH transmission timing; determining a power control adjustment for a sounding reference signal (SRS) transmission based on transmission power control (TPC) commands received in a time interval determined by one of the scheduling offset values and the additional offset; and transmitting SRS in an SRS transmission occasion, in accordance with the determined power control adjustment.

Clause 2: The method of Clause 1, wherein the SRS transmission is semi-persistent or periodic.

Clause 3: The method of any one of Clauses 1-2, wherein the additional offset is determined based on at least one of: a configured cell-specific additional offset value; or a UE-specific difference offset value.

Clause 4: The method of Clause 3, wherein the additional offset is determined by subtracting the UE-specific difference offset value from the cell-specific additional offset value.

Clause 5: The method of Clause 3, further comprising receiving a medium access control (MAC) control element (CE) that indicates the UE-specific difference offset value.

Clause 6: The method of Clause 3, wherein the time interval is determined based on a parameter that represents a number of symbols and is determined based on a number of symbols per slot, a minimum of the scheduling offset values, and the additional offset value.

Clause 7: The method of Clause 6, wherein the parameter is determined as: a product of the number of symbols per slot and a sum of: a minimum of the scheduling offset values; and $2^\mu K_{offset}$, wherein $K_{offset}$ is the additional offset value, and $\mu$ is the subcarrier spacing index corresponding to a subcarrier spacing $2^\mu \times 15$ kHz.

Clause 8: The method of Clause 6, wherein the parameter is determined as: a product of the number of symbols per slot and a sum of: a minimum of the scheduling offset values; and $2^\mu K_{offset}$, where $K_{offset} = K_{cell,offset} - K_{UE,offset}$, wherein $K_{cell,offset}$ is the configured cell-specific additional offset value and $K_{UE,offset}$ is the UE-specific difference offset value, and $\mu$ is the subcarrier spacing index corresponding to a subcarrier spacing $2^\mu \times 15$ kHz.

Clause 9: The method of Clause 8, wherein: $K_{cell,offset}$ is assumed to be 0 if the cell-specific additional offset value is not configured; and $K_{UE,offset}$ is assumed to be 0 if a UE-specific difference offset value is not signaled. $\mu$ is the subcarrier spacing index corresponding to a subcarrier spacing $2^\mu \times 15$ kHz.

Additional Wireless Communication Network Considerations

The techniques and methods described herein may be used for various wireless communications networks (or wireless wide area network (WWAN)) and radio access technologies (RATs). While aspects may be described herein using terminology commonly associated with 3G, 4G, and/or 5G (e.g., 5G new radio (NR)) wireless technologies, aspects of the present disclosure may likewise be applicable to other communication systems and standards not explicitly mentioned herein.

5G wireless communication networks may support various advanced wireless communication services, such as enhanced mobile broadband (eMBB), millimeter wave (mmWave), machine type communications (MTC), and/or mission critical targeting ultra-reliable, low-latency communications (URLLC). These services, and others, may include latency and reliability requirements.

Returning to FIG. 1, various aspects of the present disclosure may be performed within the example wireless communication network 100.

In 3GPP, the term "cell" can refer to a coverage area of a NodeB and/or a narrowband subsystem serving this coverage area, depending on the context in which the term is used. In NR systems, the term "cell" and BS, next generation NodeB (gNB or gNodeB), access point (AP), distributed unit (DU), carrier, or transmission reception point may be used interchangeably. A BS may provide communication coverage for a macro cell, a pico cell, a femto cell, and/or other types of cells.

A macro cell may generally cover a relatively large geographic area (e.g., several kilometers in radius) and may allow unrestricted access by UEs with service subscription. A pico cell may cover a relatively small geographic area (e.g., a sports stadium) and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG) and UEs for users in the home). A BS for a macro cell may be referred to as a macro BS. A BS for a pico cell may be referred to as a pico BS. A BS for a femto cell may be referred to as a femto BS, home BS, or a home NodeB.

Base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). Base stations 102 configured for 5G (e.g., 5G NR or Next Generation RAN (NG-RAN)) may interface with 5GC 190 through second backhaul links 184. Base stations 102 may communicate directly or indirectly (e.g., through the EPC 160 or 5GC 190) with each other over third backhaul links 134 (e.g., X2 interface). Third backhaul links 134 may generally be wired or wireless.

Small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. Small cell 102', employing NR in an unlicensed frequency spectrum, may boost coverage to and/or increase capacity of the access network.

Some base stations, such as gNB 180 may operate in a traditional sub-6 GHz spectrum, in millimeter wave (mmWave) frequencies, and/or near mmWave frequencies in communication with the UE 104. When the gNB 180 operates in mmWave or near mmWave frequencies, the gNB 180 may be referred to as an mmWave base station.

The communication links 120 between base stations 102 and, for example, UEs 104, may be through one or more carriers. For example, base stations 102 and UEs 104 may use spectrum up to Y MHz (e.g., 5, 10, 15, 20, 100, 400, and other MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Wireless communications system 100 further includes a Wi-Fi access point (AP) 150 in communication with Wi-Fi stations (STAs) 152 via communication links 154 in, for example, a 2.4 GHz and/or 5 GHz unlicensed frequency spectrum. When communicating in an unlicensed frequency spectrum, the STAs 152/AP 150 may perform a clear channel assessment (CCA) prior to communicating in order to determine whether the channel is available.

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, 4G (e.g., LTE), or 5G (e.g., NR), to name a few options.

EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to the IP Services 176, which may include, for example, the Internet, an intranet, an IP Multimedia Subsystem (IMS), a PS Streaming Service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and may be used to schedule MBMS transmissions. MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

5GC 190 may include an Access and Mobility Management Function (AMF) 192, other AMFs 193, a Session Management Function (SMF) 194, and a User Plane Function (UPF) 195. AMF 192 may be in communication with a Unified Data Management (UDM) 196.

AMF 192 is generally the control node that processes the signaling between UEs 104 and 5GC 190. Generally, AMF 192 provides QoS flow and session management.

All user Internet protocol (IP) packets are transferred through UPF 195, which is connected to the IP Services 197, and which provides UE IP address allocation as well as other functions for 5GC 190. IP Services 197 may include, for example, the Internet, an intranet, an IP Multimedia Subsystem (IMS), a PS Streaming Service, and/or other IP services.

Returning to FIG. 2, various example components of BS 102 and UE 104 (e.g., the wireless communication network 100 of FIG. 1) are depicted, which may be used to implement aspects of the present disclosure.

At BS 102, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), and others. The data may be for the physical downlink shared channel (PDSCH), in some examples.

A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

Processor 220 may process (e.g., encode and symbol map) the data and control information to obtain data symbols and control symbols, respectively. Transmit processor 220 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232*a*-232*t*. Each modulator in transceivers 232*a*-232*t* may process a respective output symbol stream (e.g., for OFDM) to obtain an output sample stream. Each modulator may further process (e.g., convert to analog, amplify, filter, and upconvert) the output sample stream to obtain a downlink signal. Downlink signals from the modulators in transceivers 232*a*-232*t* may be transmitted via the antennas 234*a*-234*t*, respectively.

At UE 104, antennas 252*a*-252*r* may receive the downlink signals from the BS 102 and may provide received signals to the demodulators (DEMODs) in transceivers 254*a*-254*r*, respectively. Each demodulator in transceivers 254*a*-254*r* may condition (e.g., filter, amplify, downconvert, and digitize) a respective received signal to obtain input samples. Each demodulator may further process the input samples (e.g., for OFDM) to obtain received symbols.

MIMO detector 256 may obtain received symbols from all the demodulators in transceivers 254*a*-254*r*, perform MIMO detection on the received symbols if applicable, and provide detected symbols. Receive processor 258 may process (e.g., demodulate, deinterleave, and decode) the detected symbols, provide decoded data for the UE 104 to a data sink 260, and provide decoded control information to a controller/processor 280.

On the uplink, at UE 104, transmit processor 264 may receive and process data (e.g., for the physical uplink shared channel (PUSCH)) from a data source 262 and control information (e.g., for the physical uplink control channel (PUCCH) from the controller/processor 280. Transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254*a*-254*r* (e.g., for SC-FDM), and transmitted to BS 102.

At BS 102, the uplink signals from UE 104 may be received by antennas 234*a-t*, processed by the demodulators in transceivers 232*a*-232*t*, detected by a MIMO detector 236 if applicable, and further processed by a receive processor 238 to obtain decoded data and control information sent by UE 104. Receive processor 238 may provide the decoded data to a data sink 239 and the decoded control information to the controller/processor 240.

Memories 242 and 282 may store data and program codes for BS 102 and UE 104, respectively.

Scheduler 244 may schedule UEs for data transmission on the downlink and/or uplink.

5G may utilize orthogonal frequency division multiplexing (OFDM) with a cyclic prefix (CP) on the uplink and downlink. 5G may also support half-duplex operation using time division duplexing (TDD). OFDM and single-carrier frequency division multiplexing (SC-FDM) partition the system bandwidth into multiple orthogonal subcarriers, which are also commonly referred to as tones and bins. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers in some examples. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, and others).

In various aspects, a network device, a network entity, or network node can be implemented as an aggregated network entity, as a disaggregated network entity, a component of a network entity, an integrated access and backhaul (IAB) node, a relay node, a sidelink node, to name a few examples.

The disaggregated network entity architecture may include one or more central units (CUs) that can communicate directly with a core network via a backhaul link, or indirectly with the core network through one or more disaggregated network entity units (such as a Near-Real Time (Near-RT) RAN Intelligent Controller (MC) via an E2 link, or a Non-Real Time (Non-RT) MC associated with a Service Management and Orchestration (SMO) Framework, or both). A CU may communicate with one or more distributed units (DUs) via respective midhaul links, such as an F1 interface. The DUs may communicate with one or more radio units (RUs) via respective fronthaul links. The RUs may communicate with respective UEs 104 via one or more radio frequency (RF) access links. In some implementations, the UE 104 may be simultaneously served by multiple RUs.

Each of the units, e.g., the CUs, the DUs, the RUs, as well as the Near-RT RICs, the Non-RT RICs and the SMO Framework, may include one or more interfaces or be coupled to one or more interfaces configured to receive or transmit signals, data, or information (collectively, signals) via a wired or wireless transmission medium. Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally or alternatively, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU. The CU may be configured to handle user plane functionality (e.g., Central Unit-User Plane (CU-UP)), control plane functionality (e.g., Central Unit-Control Plane (CU-CP)), or a combination thereof. In some implementations, the CU can be logically split into one or more CU-UP units and one or more CU-CP units. The CU-UP unit can communicate bidirectionally with the CU-CP unit via an interface, such as the E1 interface when implemented in an O-RAN configuration. The CU can be implemented to communicate with the DU, as necessary, for network control and signaling.

The DU may correspond to a logical unit that includes one or more network entity functions to control the operation of one or more RUs. In some aspects, the DU may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the $3^{rd}$ Generation Partnership Project (3 GPP). In some aspects, the DU may further host one or more low PHY layers. Each layer (or module) can be implemented with an interface configured to communicate signals with other layers (and modules) hosted by the DU, or with the control functions hosted by the CU.

Lower-layer functionality can be implemented by one or more RUs. In some deployments, an RU, controlled by a DU, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) can be implemented to handle over the air (OTA) communications with one or more UEs 104. In some implementations, real-time and non-real-time aspects of control and user plane communications with the RU(s) can be controlled by the corresponding DU. In some scenarios, this configuration can enable the DU(s) and the CU to be implemented in a cloud-based RAN architecture, such as a vRAN architecture.

The SMO Framework may be configured to support RAN deployment and provisioning of non-virtualized and virtualized network elements. For non-virtualized network elements, the SMO Framework may be configured to support the deployment of dedicated physical resources for RAN coverage requirements which may be managed via an operations and maintenance interface (such as an O1 interface). For virtualized network elements, the SMO Framework may be configured to interact with a cloud computing platform (such as an open cloud (O-Cloud)) to perform network element life cycle management (such as to instantiate virtualized network elements) via a cloud computing platform interface (such as an O2 interface). Such virtualized network elements can include, but are not limited to, CUs, DUs, RUs and Near-RT RICs. In some implementations, the SMO Framework can communicate with a hardware aspect of a 4G RAN, such as an open eNB (O-eNB), via an O1 interface. Additionally, in some implementations, the SMO Framework can communicate directly with one or more RUs via an O1 interface. The SMO Framework also may include a Non-RT RIC configured to support functionality of the SMO Framework.

The Non-RT RIC may be configured to include a logical function that enables non-real-time control and optimization of RAN elements and resources, Artificial Intelligence/Machine Learning (AI/ML) workflows including model training and updates, or policy-based guidance of applications/features in the Near-RT RIC. The Non-RT RIC may be coupled to or communicate with (such as via an A1 interface) the Near-RT RIC. The Near-RT RIC may be configured to include a logical function that enables near-real-time control and optimization of RAN elements and resources via data collection and actions over an interface (such as via an E2 interface) connecting one or more CUs, one or more DUs, or both, as well as an O-eNB, with the Near-RT MC.

In some implementations, to generate AI/ML models to be deployed in the Near-RT MC, the Non-RT MC may receive parameters or external enrichment information from external servers. Such information may be utilized by the Near-RT RIC and may be received at the SMO Framework or the Non-RT RIC from non-network data sources or from network functions. In some examples, the Non-RT RIC or the Near-RT RIC may be configured to tune RAN behavior or performance. For example, the Non-RT RIC may monitor long-term trends and patterns for performance and employ AI/ML models to perform corrective actions through the SMO Framework (such as reconfiguration via O1) or via creation of RAN management policies (such as A1 policies).

As above, FIGS. 3A-3D depict various example aspects of data structures for a wireless communication network, such as wireless communication network 100 of FIG. 1.

In various aspects, the 5G frame structure may be frequency division duplex (FDD), in which for a particular set of subcarriers (carrier system bandwidth), subframes within the set of subcarriers are dedicated for either DL or UL. 5G frame structures may also be time division duplex (TDD), in which for a particular set of subcarriers (carrier system bandwidth), subframes within the set of subcarriers are dedicated for both DL and UL. In the examples provided by FIGS. 3A and 3C, the 5G frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description below applies also to a 5G frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. In some examples, each slot may include 7 or 14 symbols, depending on the slot configuration.

For example, for slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission).

The number of slots within a subframe is based on the slot configuration and the numerology. For slot configuration 0, different numerologies 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2\mu$ slots/subframe. The subcarrier spacing and symbol length/duration are a function of the numerology. The subcarrier spacing may be equal to $2^{\mu} \times 15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 3A-3D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 3A, some of the REs carry reference (pilot) signals (RS) for a UE (e.g., UE 104 of FIGS. 1 and 2). The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 3B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol.

A primary synchronization signal (PSS) may be within symbol 2 of particular subframes of a frame. The PSS is used by a UE (e.g., 104 of FIGS. 1 and 2) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 3C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 3D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Additional Considerations

The preceding description provides examples of data collection reporting for NTN networks. The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The techniques described herein may be used for various wireless communication technologies, such as 5G (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, and others. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, and others. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment (see FIG. 1), a user interface (e.g., keypad, display, mouse, joystick, touchscreen, biometric sensor, proximity sensor, light emitting element, and others) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for wireless communications by a user equipment (UE), comprising:
    receiving signaling indicating one or more values for a scheduling offset between a downlink slot where downlink control information (DCI) is received and an uplink slot for transmitting a physical uplink shared channel (PUSCH) scheduled by the DCI;
    determining an additional offset to be used in conjunction with the scheduling offset values to determine PUSCH transmission timing;
    determining a power control adjustment for a sounding reference signal (SRS) transmission based on transmission power control (TPC) commands received in a time interval determined by one of the scheduling offset values and the additional offset; and
    transmitting SRS in an SRS transmission occasion, in accordance with the determined power control adjustment.

2. The method of claim 1, wherein the time interval starts a first number of symbols before a previous SRS transmission occasion and ends a second number of symbols before the SRS transmission occasion.

3. The method of claim 1, wherein the power control adjustment is determined based on one or more TPC commands accumulated in the time interval.

4. The method of claim 1, wherein the SRS transmission is semi-persistent or periodic.

5. The method of claim 1, wherein the additional offset is determined based on at least one of:
    a configured cell-specific additional offset value; or
    a UE-specific difference offset value.

6. The method of claim 5, wherein the additional offset is determined by subtracting the UE-specific difference offset value from the configured cell-specific additional offset value.

7. The method of claim 5, further comprising receiving a medium access control (MAC) control element (CE) that indicates the UE-specific difference offset value.

8. The method of claim 5, wherein the time interval is determined based on a parameter that represents a number of symbols and is determined based on a number of symbols per slot, a minimum of the scheduling offset values, and the additional offset value.

9. The method of claim 8, wherein the parameter is determined as:
    a product of the number of symbols per slot and a sum of:
        a minimum of the scheduling offset values; and $2^\mu$Koffset, wherein Koffset is the additional offset value, and u is a subcarrier spacing index corresponding to a subcarrier spacing of $2^\mu \times 15$ kHz.

10. The method of claim 8, wherein the parameter is determined as:
   a product of the number of symbols per slot and a sum of:
      a minimum of the scheduling offset values; and
      $2^\mu K_{offset}$, where $K_{offset} = K_{cell,offset} - K_{UE,offset}$, wherein $K_{cell,offset}$ is the configured cell-specific additional offset value and $K_{UE,offset}$ is the UE-specific difference offset value, and u is a subcarrier spacing index corresponding to a subcarrier spacing of $2^\mu \times 15$ kHz.

11. The method of claim 10, wherein:
   $K_{cell,offset}$ is assumed to be 0 if the cell-specific additional offset value is not configured; and
   $K_{UE,offset}$ is assumed to be 0 if a UE-specific difference offset value is not signaled, and μ is the subcarrier spacing index corresponding to a subcarrier spacing of $2^\mu \times 15$ kHz.

12. An apparatus for wireless communication at a user equipment (UE), comprising: a memory comprising computer-executable instructions; and one or more processors configured to execute the computer-executable instructions and cause the apparatus to:
   receive signaling configuring the UE with one or more values for a scheduling offset between a downlink slot where downlink control information (DCI) is received and an uplink slot for transmitting a physical uplink shared channel (PUSCH) scheduled by the DCI;
   determine an additional offset to be used in conjunction with the scheduling offset values to determine PUSCH transmission timing;
   determine a power control adjustment for a sounding reference signal (SRS) transmission based on transmission power control (TPC) commands received in a time interval determined by one of the scheduling offset values and the additional offset; and
   transmit SRS in an SRS transmission occasion, in accordance with the determined power control adjustment.

13. The apparatus of claim 12, wherein the time interval starts a first number of symbols before a previous SRS transmission occasion and ends a second number of symbols before the SRS transmission occasion.

14. The apparatus of claim 12, wherein the power control adjustment is determined based on one or more TPC commands accumulated in the time interval.

15. The apparatus of claim 12, wherein the SRS transmission is semi-persistent or periodic.

16. The apparatus of claim 12, wherein the additional offset is determined based on at least one of:
   a configured cell-specific additional offset value; or
   a UE-specific difference offset value.

17. The apparatus of claim 16, wherein the additional offset is determined by subtracting the UE-specific difference offset value from the configured cell-specific additional offset value.

18. The apparatus of claim 16, wherein the one or more processors are further configured to execute the computer-executable instructions and cause the apparatus to:
   receive a medium access control (MAC) control element (CE) that indicates the UE-specific difference offset value.

19. The apparatus of claim 16, wherein the time interval is determined based on a parameter that represents a number of symbols and is determined based on a number of symbols per slot, a minimum of the scheduling offset values, and the additional offset value.

20. The apparatus of claim 19, wherein the parameter is determined as:
   a product of the number of symbols per slot and a sum of:
      a minimum of the scheduling offset values; and
      $2^\mu$Koffset, wherein Koffset is the additional offset value, and μ is a subcarrier spacing index corresponding to a subcarrier spacing of $2^\mu \times 15$ kHz.

21. The apparatus of claim 19, wherein the parameter is determined as:
   a product of the number of symbols per slot and a sum of:
      a minimum of the scheduling offset values; and
      $2^\mu K_{offset}$, where $K_{offset} = K_{cell,offset} - K_{UE,offset}$, wherein $K_{cell,offset}$ is the configured cell-specific additional offset value and $K_{UE,offset}$ is the UE-specific difference offset value, and u is a subcarrier spacing index corresponding to a subcarrier spacing of $2^\mu \times 15$ kHz.

22. The apparatus of claim 21, wherein:
   $K_{cell,offset}$ is assumed to be 0 if the cell-specific additional offset value is not configured; and
   $K_{UE,offset}$ is assumed to be 0 if a UE-specific difference offset value is not signaled, u is the subcarrier spacing index corresponding to a subcarrier spacing of $2^\mu \times 15$ kHz.

23. A non-transitory computer readable medium having instructions stored thereon for:
   receiving signaling indicating one or more values for a scheduling offset between a downlink slot where downlink control information (DCI) is received and an uplink slot for transmitting a physical uplink shared channel (PUSCH) scheduled by the DCI;
   determining an additional offset to be used in conjunction with the scheduling offset values to determine PUSCH transmission timing;
   determining a power control adjustment for a sounding reference signal (SRS) transmission based on transmission power control (TPC) commands received in a time interval determined by one of the scheduling offset values and the additional offset; and
   transmitting SRS in an SRS transmission occasion, in accordance with the determined power control adjustment.

24. An apparatus for wireless communication at a user equipment (UE), comprising:
   means for receiving signaling indicating one or more values for a scheduling offset between a downlink slot where downlink control information (DCI) is received and an uplink slot for transmitting a physical uplink shared channel (PUSCH) scheduled by the DCI;
   means for determining an additional offset to be used in conjunction with the scheduling offset values to determine PUSCH transmission timing;
   means for determining a power control adjustment for a sounding reference signal (SRS) transmission based on transmission power control (TPC) commands received in a time interval determined by one of the scheduling offset values and the additional offset; and
   means for transmitting SRS in an SRS transmission occasion, in accordance with the determined power control adjustment.

25. The apparatus of claim 24, wherein the time interval starts a first number of symbols before a previous SRS transmission occasion and ends a second number of symbols before the SRS transmission occasion.

26. The apparatus of claim 24, wherein the power control adjustment is determined based on one or more TPC commands accumulated in the time interval.

27. The apparatus of claim 24, wherein the SRS transmission is semi-persistent or periodic.

28. The apparatus of claim 24, wherein the additional offset is determined based on at least one of:
 a configured cell-specific additional offset value; or
 a UE-specific difference offset value.

29. The apparatus of claim 28, wherein the additional offset is determined by subtracting the UE-specific difference offset value from the configured cell-specific additional offset value.

30. The apparatus of claim 28, further comprising means for receiving a medium access control (MAC) control element (CE) that indicates the UE-specific difference offset value.

* * * * *